Patented Feb. 9, 1954

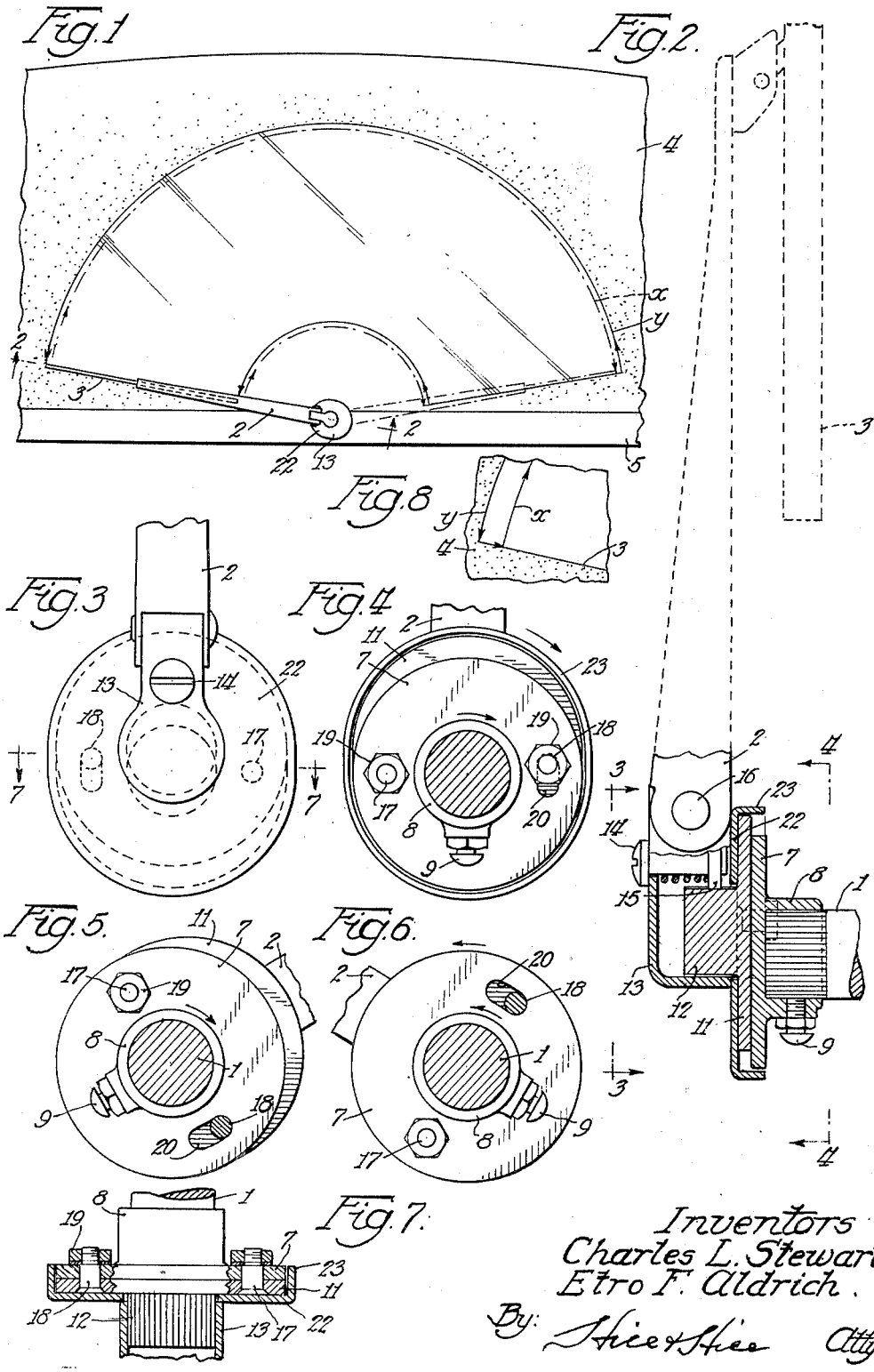

2,668,726

UNITED STATES PATENT OFFICE 2,668,726

WINDSHIELD WIPER

Charles L. Stewart and Etro F. Aldrich, Chicago, Ill.

Application December 29, 1949, Serial No. 135,573

8 Claims. (Cl. 287—53)

Our invention relates to windshield wipers or the like adapted to wipe the windshields of passenger automobiles, trucks, buses, airplanes, street cars or other vehicles. It is adapted to be employed in connection with a wiper arm actuated by a rock or oscillating shaft of the type powered by suction or air pressure mechanism or electrically driven, the same actuating the wiper arm operatively connected with our unit to the said rock shaft.

The invention has particularly as an object an efficient connecting means adapted to be applied to a windshield wiper for connecting any type of arm to the rock shaft regardless of the driving means for the rock shaft.

It has particularly as an object the production of a connection or attachment for connecting the arm and shaft which is adapted to shift the arm and wiping blade lengthwise relative the axis of the driving shaft whereby the path of travel of the wiper blade is varied as the arm is swung back and forth in front of the glass or like shield which is to be cleaned.

The results derived from this alternate movement of wiper arm, away from, and toward the center of rotation or axis of the shaft in each successive sweep of the arm, are obvious. Wiper blades, being made of rubber, sooner or later become pitted, or develop unevenness along the wiping edge. When such blades travel back and forth in the usual manner, these uneven places or pits as the case might be, cause lines or streaks in the form of arcs on the windshield. The reason for this is the fact that the pits which cause streaks when sweeping in one direction, follow exactly the same streaks when sweeping in the opposite direction, therefore said streaks remain on the windshield for some time before being obliterated by many repeated sweeps, and in many instances, streaks will remain until washed off in some other manner. With our invention attached to the wiper post between it and the arm, pits or uneven places on wiper rubber will scribe different arcs with each successive sweep of blade, thereby causing streaks to disappear in a very few sweeps of wiper blade.

The advantages of having our invention installed wherever windshield wipers are needed and used, are many in number: driving safety depends upon road visibility, driving in rain, snow and under muddy road conditions at the general run of speed or in fog, make clear vision of double importance and lives are dependent upon a clear view for the driver. With our invention, we can safely say, as a result of tests made under all conditions, that smeared and fogged windshields can be cleared in much less time and will stay clean longer. The device itself is simple to manufacture, can be made at low cost, and will provide more safety for all vehicles requiring wipers.

The invention has among its further objects, the production of a device of the kind described that is simple, compact, efficient, inexpensive and readily applied to practically any commercial windshield wiper.

In use at each stroke or sweep of the blade across the windshield, its path is so varied that the same does not tend to smear on the glass as is done by the present windshield wipers on the market.

Many other objects and advantages of the construction herein shown and described will be obvious to those skilled in the art from the disclosure herein given.

To this end our invention consists in the novel construction, arrangement and combination of parts herein shown and described, and more particularly pointed out in the claims.

In the drawing, wherein like reference characters indicate like or corresponding parts:

Fig. 1 is a view in elevation of a portion of a windshield with our device applied thereto;

Fig. 2 is a sectional view taken substantially on line 2—2 of Fig. 1;

Fig. 3 is a view in elevation illustrating a front view of the device as applied to a wiper arm, only a portion of the arm being shown;

Fig. 4 is a similar view of the opposite face of the device showing the rock shaft in section;

Figs. 5 and 6 are views similar to Fig. 4, more or less diagrammatically illustrating the operation;

Fig. 7 is a sectional view taken substantially on line 7—7 of Fig. 3; and

Fig. 8 is a view similar to a portion of Fig. 1 on an enlarged scale illustrating the varied travel of the blade.

Referring to the drawing in which only the preferred embodiment of the invention is shown, I represents a rock or oscillating shaft commonly employed for driving wiper arms, which shaft may be driven by an electric motor or a fluid pressure or vacuum motor, the driving mechanism for the shaft forming no part of the present invention. In Fig. 2 is shown a portion of a wiper arm 2 and in dotted lines a wiper blade 3. The particular arm or blade construction and method of securing the particular arm to the attachment and the blade to the arm form no part of the present invention other than as a part of the combination, since any style of arm represented by 2, and any style of blade represented by 3, may be employed. In the various constructions now commonly used, the arm 2 is directly connected to the rock shaft 1, and our invention relates to a connecting unit adapted to be secured to the shaft 1 and transmit its movement to the arm 2.

Referring particularly to Figs. 2 and 7, a first member 7 having a flanged end portion is provided with the tubular extension 8 adapted to fit on and be secured to the shaft 1, any securing means, found applicable, being employed. A small set screw 9 for the purpose is shown in the drawing. A cooperating second member 11 having a flanged end portion which first carries a projecting portion 12 and arm 2 is provided and secured to the member 7, the same being provided with the projecting portion 12 to which the arm 2 is non-rotatably secured. In the particular arm illustrated, the same is provided with an extension 13 and secured to 12 by a screw 14 and cooperating clutch member 15. The particular arm shown is pivotally secured to 13 by a screw 16 or the equivalent. As previously mentioned it should be understood that this represents an arm forming no part of the present invention except in the combination. Any type of arm provided with a socket adapted to receive the portion 12 of the member 11 may be employed and the same secured to 12 in any suitable manner. The portion 12 is actually an extension on the shaft 1, but is adjustable on the shaft to provide the movement hereinafter described.

The members 7 and 11 are adjustable relative each other, the two being secured together by means of bolts 17 and 18 or their equivalents, as for example, rivets. Bolts 17 and 18 are shown, however, together with the nuts 19. The member 11 is actually pivotally secured to member 7 by means of the bolt 17, but the parts are relatively adjustable by virtue of the slots 20 in member 7 so that the members 7 and 11 when the shaft is operated cooperate to move in relatively eccentric movement to the member 7 and move the wiper arm lengthwise as the shaft 1 is rocked back and forth and the arm 2 and blade 3 swung across the windshield.

It is obvious by referring to Fig. 4 that as member 7 is rotated, as for example, in the direction indicated by the arrow, the engagement of the bolt 18 will be at one end of the slot 20, and as the shaft 1 is rotated in the opposite direction, 18 will engage the opposite end of the slot 20. At the end of the stroke in the direction indicated by the arrow, the member 7 will be moved as shown in Fig. 5 which shows the parts at the end of a stroke, Fig. 4 illustrating it before the end of a stroke. As the shaft 1 is turned in the opposite direction, the bolt 18 engages the opposite end of the slot 20 as shown in Fig. 6.

As illustrated in Figs. 2 and 7, the member 11 may be provided with the flange 23, either formed integrally therewith or on a separable part 22, the same providing to a certain extent an enclosure for the members 7 and 11.

We have illustrated in Figs. 1 and 8, the path of a point on the wiper blade 3 illustrating by the line $x$ the path when the blade is moved in one direction until the end of the stroke, and at the end of the stroke how the blade is moved outwardly relative the axis of the shaft 1 to travel on a path indicated by the line $y$. The distance between the lines $x$ and $y$ represents diagrammatically the different paths of the blade as the shaft 1 is rocked back and forth while driven by a suitable source of power.

Assuming that the windshield or surface to be wiped is dirty from accumulated road dirt, snow, dust, ice or the like, the blade traveling in the different paths as it changes its direction of sweep does not travel over the same path as is the ordinary practice, so that any dirty streak or smear left as the arm moves in one direction is cleaned away when the arm moves in the opposite direction. The result is that the windshield glass is maintained clear and visibility is not impaired.

As before mentioned, our invention relates to a connecting unit arranged between the shaft 1, regardless of how driven, and the arm 2, regardless of the arm construction. In applying our connector to a wiping apparatus the member 7 is secured to the shaft and the arm secured to the projection 12 on the member 11. The device is applicable as original equipment or may be applied as an addition to equipment supplied by the manufacturer or to old equipment, or may be built in as part of the windshield wiper equipment. The only tool required to install the unit as illustrated, is a screw driver or wrench, the application or removal taking but a moment without requiring the services or a skilled mechanic.

Having thus described our invention, it is obvious that various immaterial modifications may be made in the same without departing from the spirit of our invention; hence, we do not wish to be understood as limiting ourselves to the exact form, construction, arrangement and combination of parts herein shown and described, or uses mentioned.

What we claim as new and desire to secure by Letters Patent is:

1. A windshield wiper coupling comprising a first member adapted to be rotated about a fixed axis through a fixed arc in an oscillatory manner, a second member eccentrically and pivotally joined to said first member in abutting relationship at a point offset from the axis of rotation of said first member, said second member being oscillatable with respect to said first member, and coacting means on said first member and said second member restricting the oscillatory movement of said second member relative to said first member with predetermined limits during the oscillatory movement of the first member but permitting maximum relative movement of the first and second members with respect to each other at the beginning of each stroke of the first member as it is oscillated.

2. A windshield wiper including in combination a wiper arm, a rock shaft oscillatable through a predetermined arc about a fixed axis, and coupling means eccentrically and pivotally connecting said wiper arm to said rock shaft, said coupling means comprising a first member secured to said rock shaft, a second member pivotally mounted to said first member in abutting relationship at a point spaced from the axis of rotation of said rock shaft and said first member, said second member having said wiper arm secured thereto, and coacting means on said second member and said first member restricting oscillatory movement of said second member relative to said first member within predetermined limits.

3. A windshield wiper coupling for connecting a windshield wiper arm to a driven oscillating rock shaft, said coupling comprising a first member including a tubular extension adapted to be secured to an oscillating rock shaft, and including a flanged end portion, a second member including a projecting portion adapted to have a wiper arm secured thereto and including a flanged end portion, the flanged end portions of said first and second members being pivotally joined together in abutting relationship at a point spaced from the centers of said members whereby said members may oscillate relative to each other, and co-operating means on said first and second members restricting the oscillation therebetween.

4. A windshield wiper including in combination a wiper arm, a rock shaft oscillatable through a predetermined arc about a fixed axis, and coupling means connecting said wiper arm to said rock shaft, said coupling means comprising a first member secured to said rock shaft and having a flanged end portion, a second member adapted to have a wiper arm secured thereto and having a flanged end portion, the flanged end portions of said first and second members being operatively mounted contiguous to each other and pivotally joined together at a point spaced from the centers of said members whereby said members may oscillate relative to each other, and cooperating means on said first and second members restricting the oscillation therebetween.

5. A windshield wiper coupling for connecting a windshield wiper arm to a driven oscillating rock shaft, said coupling comprising a first member adapted to be secured to an oscillating rock shaft, a second member adapted to have a wiper arm secured thereto, said first and second members including similar flanged end portions operatively joined together eccentrically with the contiguous faces of the flanged end portions in abutting relationship whereby said members may rotate relative to each other, and means operatively connecting said first and second members together and for restricting the relative movement therebetween.

6. A windshield wiper coupling for connecting a windshield wiper arm to a driven oscillating rock shaft, said coupling comprising a first member adapted to be secured to an oscillating rock shaft and including a flanged end portion, a second member adapted to have a wiper arm secured thereto and including a flanged end portion similarly formed to said first mentioned flanged end portion, said first and second members pivotally joined together eccentrically with the contiguous faces of said flanged end portions in abutting relationship whereby said members may rotate relative to each other, and means operatively connecting said similarly formed portions together and for restricting the relative movement therebetween.

7. A windshield wiper coupling for connecting a windshield wiper arm including a wiper blade to a driven oscillating rock shaft, said coupling comprising a first member adapted to be secured to an oscillating rock shaft, a second member adapted to have a wiper arm secured thereto, said first and second members including similar flanged end portions operatively joined together eccentrically with the contiguous faces of said flanged end portions in abutting relationship whereby said members may rotate relative to each other, means operatively connecting said first and second members together whereby the windshield wiper arm is laterally shifted at the beginning of each stroke as the rock shaft is oscillated shifting the wiper blade with a cutting action so that the blade retraces a different area slightly shifted during each half cycle of the rock shaft.

8. A windshield wiper including in combination a wiper arm, a wiper blade, a rock shaft rotatable through a predetermined arc about a fixed axis during each half cycle of operation, and coupling means comprising a first member adapted to be secured to an oscillating rock shaft, a second member adapted to have a wiper arm secured thereto, said first and second members including similar flanged end portions operatively joined together eccentrically with the contiguous faces of said first and second members in abutting relationship whereby said members may rotate relative to each other, means operatively connecting said first and second members together whereby the windshield wiper arm is shifted laterally at the beginning of each stroke as the rock shaft is oscillated shifting the wiper blade with a cutting action so that the blade retraces a different area slightly shifted during each half cycle of the rock shaft.

CHARLES L. STEWART.
ETRO F. ALDRICH.

References Cited in the file of this patent

UNITED STATES PATENTS

| Number | Name | Date |
|---|---|---|
| 797,289 | Kennedy et al. | Aug. 15, 1903 |
| 2,286,035 | Horton et al. | June 9, 1942 |
| 2,307,366 | Ericson | Jan. 5, 1943 |
| 2,528,283 | Nesson | Oct. 31, 1950 |